(12) United States Patent  (10) Patent No.: US 9,334,425 B2
Henderson  (45) Date of Patent: May 10, 2016

(54) REMOVABLE ADHESIVE LABEL CONTAINING HIGH TENSILE MODULUS POLYMERIC FILM LAYER

(75) Inventor: Kevin O. Henderson, Willoughby Hills, OH (US)

(73) Assignee: Avery Dennison Corporation, Glendale, CA (US)

( * ) Notice: Subject to any disclaimer, the term of this patent is extended or adjusted under 35 U.S.C. 154(b) by 166 days.

(21) Appl. No.: 13/262,416

(22) PCT Filed: Mar. 30, 2010

(86) PCT No.: PCT/US2010/029169
§ 371 (c)(1),
(2), (4) Date: Nov. 29, 2011

(87) PCT Pub. No.: WO2010/117767
PCT Pub. Date: Oct. 14, 2010

(65) Prior Publication Data
US 2013/0008613 A1  Jan. 10, 2013

Related U.S. Application Data

(60) Provisional application No. 61/164,694, filed on Mar. 30, 2009.

(51) Int. Cl.
*C09J 7/02* (2006.01)
*B32B 7/12* (2006.01)
(Continued)

(52) U.S. Cl.
CPC .................. *C09J 7/0296* (2013.01); *B32B 7/02* (2013.01); *B32B 7/12* (2013.01); *B32B 27/08* (2013.01); *B32B 27/10* (2013.01); *B32B 27/18* (2013.01);
(Continued)

(58) Field of Classification Search
CPC ..... G09F 3/02; G09F 3/10; G09F 2003/0242; C09J 7/0296; C09J 2201/162; C09J 2400/226; C09J 7/02; C09J 7/0207; C09J 2201/606; B32B 7/12; B32B 27/08; B32B 2250/03; B32B 2250/04; B32B 7/005; Y10T 428/14; Y10T 428/28; Y10T 428/24848
USPC ............... 428/40.1, 40.6, 41.5, 343, 351, 354
See application file for complete search history.

(56) References Cited

U.S. PATENT DOCUMENTS 4,501,845 A  2/1985  Baus et al.
4,536,060 A  8/1985  Takamatsu et al.
(Continued)

FOREIGN PATENT DOCUMENTS

CN  1201475  12/1998
CN  1608083  4/2005
(Continued)

OTHER PUBLICATIONS

International Search Report for International Application Serial No. PCT/US2010/029169.
(Continued)

*Primary Examiner* — Patricia L Nordmeyer
(74) *Attorney, Agent, or Firm* — Avery Dennison Corporation

(57) ABSTRACT

An adhesive label includes a polymeric first film layer that has a high tensile modulus. The label is useful in various labeling applications and especially in adhesive labeling of reusable and recyclable containers which require removal of the label during a washing process in a warm or hot washing fluid.

29 Claims, 4 Drawing Sheets

(51) Int. Cl.
*B32B 3/10* (2006.01)
*B32B 1/02* (2006.01)
*B32B 43/00* (2006.01)
*B32B 33/00* (2006.01)
*B32B 27/08* (2006.01)
*G09F 3/10* (2006.01)
*B32B 7/02* (2006.01)
*B32B 27/10* (2006.01)
*B32B 27/18* (2006.01)
*B32B 27/20* (2006.01)
*B32B 27/28* (2006.01)
*B32B 27/30* (2006.01)
*B32B 27/32* (2006.01)
*B32B 27/34* (2006.01)
*B32B 27/36* (2006.01)
*B32B 27/40* (2006.01)

(52) U.S. Cl.
CPC .......... *B32B 27/20* (2013.01); *B32B 27/281* (2013.01); *B32B 27/285* (2013.01); *B32B 27/286* (2013.01); *B32B 27/302* (2013.01); *B32B 27/304* (2013.01); *B32B 27/308* (2013.01); *B32B 27/32* (2013.01); *B32B 27/322* (2013.01); *B32B 27/34* (2013.01); *B32B 27/36* (2013.01); *B32B 27/365* (2013.01); *B32B 27/40* (2013.01); *G09F 3/10* (2013.01); *B32B 2255/10* (2013.01); *B32B 2255/12* (2013.01); *B32B 2255/26* (2013.01); *B32B 2270/00* (2013.01); *B32B 2307/30* (2013.01); *B32B 2307/412* (2013.01); *B32B 2307/516* (2013.01); *B32B 2307/518* (2013.01); *B32B 2307/54* (2013.01); *B32B 2307/554* (2013.01); *B32B 2307/72* (2013.01); *B32B 2307/7265* (2013.01); *B32B 2307/736* (2013.01); *B32B 2307/748* (2013.01); *B32B 2519/00* (2013.01); *C09J 2201/162* (2013.01); *C09J 2203/334* (2013.01); *C09J 2400/226* (2013.01); *Y10T 156/1111* (2015.01); *Y10T 428/1352* (2015.01); *Y10T 428/1476* (2015.01); *Y10T 428/24851* (2015.01); *Y10T 428/24959* (2015.01); *Y10T 428/28* (2015.01); *Y10T 428/2848* (2015.01)

(56) References Cited

U.S. PATENT DOCUMENTS

| | | | |
|---|---|---|---|
| 4,562,684 A | 1/1986 | Dreher | |
| 4,608,284 A | 8/1986 | Roales | |
| 4,662,965 A | 5/1987 | DiFrank et al. | |
| 4,725,454 A | 2/1988 | Galli et al. | |
| 4,744,918 A | 5/1988 | Heppke et al. | |
| 4,879,177 A | 11/1989 | Boice | |
| 5,100,963 A | 3/1992 | Lin | |
| 5,156,911 A | 10/1992 | Stewart | |
| 5,190,609 A | 3/1993 | Lin et al. | |
| 5,229,447 A | 7/1993 | Miyajima et al. | |
| 5,251,048 A | 10/1993 | Doane et al. | |
| 5,292,566 A | 3/1994 | Shacklett, III | |
| 5,330,961 A | 7/1994 | Takeyama et al. | |
| 5,384,067 A | 1/1995 | Doane et al. | |
| 5,387,450 A | 2/1995 | Stewart | |
| 5,437,811 A | 8/1995 | Doane et al. | |
| 5,466,496 A | 11/1995 | Jin | |
| 5,626,955 A | 5/1997 | Goetz et al. | |
| 5,665,443 A | 9/1997 | Hata et al. | |
| 5,668,614 A | 9/1997 | Chien et al. | |
| 5,668,651 A | 9/1997 | Yamada et al. | |
| 5,691,795 A | 11/1997 | Doane et al. | |
| 5,695,682 A | 12/1997 | Doane et al. | |
| 5,709,391 A | 1/1998 | Arakawa et al. | |
| 5,709,937 A | 1/1998 | Adams et al. | |
| 5,712,031 A * | 1/1998 | Kelch et al. | 428/355 BL |
| 5,725,966 A | 3/1998 | Abe et al. | |
| 5,748,277 A | 5/1998 | Huang et al. | |
| 5,766,508 A | 6/1998 | Kawasumi et al. | |
| 5,766,694 A | 6/1998 | West et al. | |
| 5,928,803 A | 7/1999 | Yasuda | |
| 5,929,960 A | 7/1999 | West et al. | |
| 5,940,150 A | 8/1999 | Faris et al. | |
| 5,964,975 A | 10/1999 | Hinton | |
| 6,042,930 A | 3/2000 | Kelch et al. | |
| 6,049,366 A | 4/2000 | Hakemi et al. | |
| 6,072,549 A | 6/2000 | Faris et al. | |
| 6,106,982 A | 8/2000 | Mientus et al. | |
| 6,108,062 A | 8/2000 | Takeuchi et al. | |
| 6,136,903 A | 10/2000 | Su et al. | |
| 6,153,288 A | 11/2000 | Shih et al. | |
| 6,249,332 B1 | 6/2001 | Bryan-Brown et al. | |
| 6,319,428 B1 | 11/2001 | Michot et al. | |
| 6,429,961 B1 | 8/2002 | Harary et al. | |
| 6,508,560 B2 | 1/2003 | Epstein et al. | |
| 6,621,539 B2 | 9/2003 | Nakamura | |
| 6,674,504 B1 | 1/2004 | Li et al. | |
| 6,680,097 B1 | 1/2004 | Amberger et al. | |
| 6,680,758 B1 | 1/2004 | Faris | |
| 6,726,969 B1 | 4/2004 | Balaji et al. | |
| 6,761,969 B2 * | 7/2004 | Li et al. | 428/354 |
| 6,821,592 B2 | 11/2004 | Rodick | |
| 6,927,267 B1 | 8/2005 | Varela de la Rosa et al. | |
| 7,144,542 B2 | 12/2006 | Holzer et al. | |
| 7,217,463 B2 | 5/2007 | Henderson | |
| 7,294,380 B2 | 11/2007 | Squier et al. | |
| 8,535,464 B2 | 9/2013 | Lorence et al. | |
| 2001/0003765 A1 | 6/2001 | Mallya | |
| 2001/0018125 A1 * | 8/2001 | Shibuya et al. | 428/352 |
| 2002/0084565 A1 | 7/2002 | Dautartas et al. | |
| 2002/0119292 A1 * | 8/2002 | Venkatasanthanam et al. | 428/174 |
| 2003/0083523 A1 | 5/2003 | Ando et al. | |
| 2003/0150148 A1 | 8/2003 | Spear et al. | |
| 2003/0193709 A1 | 10/2003 | Mallya et al. | |
| 2003/0207065 A1 | 11/2003 | Sher et al. | |
| 2004/0033349 A1 * | 2/2004 | Henderson | 428/304.4 |
| 2004/0038026 A1 | 2/2004 | Li et al. | |
| 2004/0219321 A1 | 11/2004 | Squier et al. | |
| 2005/0083564 A1 | 4/2005 | Mallya et al. | |
| 2005/0090619 A1 | 4/2005 | Yoshimura | |
| 2006/0036556 A1 | 2/2006 | Knispel | |
| 2006/0251891 A1 | 11/2006 | Aarnio | |
| 2006/0263600 A1 | 11/2006 | Bartholomew et al. | |
| 2007/0154668 A1 | 7/2007 | Rhee et al. | |
| 2007/0213449 A1 | 9/2007 | Lewandowski | |
| 2008/0118740 A1 | 5/2008 | Kuwahara et al. | |
| 2009/0218307 A1 * | 9/2009 | Davies et al. | 215/365 |
| 2009/0233067 A1 * | 9/2009 | Doornheim et al. | 428/203 |
| 2010/0051200 A1 | 3/2010 | Mueller et al. | |
| 2010/0285249 A1 | 11/2010 | Mitchell et al. | |
| 2012/0018098 A1 | 1/2012 | Henderson | |
| 2012/0034402 A1 | 2/2012 | Henderson | |
| 2013/0146230 A1 | 6/2013 | Davies et al. | |
| 2015/0255008 A1 | 9/2015 | Henderson | |
| 2015/0279247 A1 | 10/2015 | Henderson | |

FOREIGN PATENT DOCUMENTS

| | | |
|---|---|---|
| CN | 1791651 | 6/2006 |
| CN | 101258213 | 9/2008 |
| DE | 3909089 | 9/1990 |
| DE | 19716875 | 11/1997 |
| EP | 0317180 | 5/1989 |
| EP | 0471767 | 2/1992 |
| EP | 0498249 | 8/1998 |
| EP | 0924678 | 6/1999 |
| EP | 0951004 | 10/1999 |
| EP | 1055715 | 11/2000 |
| EP | 1115745 | 7/2001 |
| EP | 1375621 | 1/2004 |
| EP | 1688445 | 8/2006 |

(56) References Cited

FOREIGN PATENT DOCUMENTS

| | | |
|---|---|---|
| EP | 1743006 | 1/2007 |
| EP | 1866895 | 12/2007 |
| GB | 2259291 | 3/1993 |
| GB | 2411877 | 9/2005 |
| GB | 2411881 | 9/2005 |
| GB | 2424865 | 10/2006 |
| GB | 2425107 | 10/2006 |
| JP | 5-173487 | 7/1993 |
| JP | 6-158006 | 6/1994 |
| JP | 6-266288 | 9/1994 |
| JP | 9-251272 | 9/1997 |
| JP | 11-057558 | 3/1999 |
| JP | 11-246395 | 9/1999 |
| JP | 11-273636 | 10/1999 |
| JP | 2000-144086 | 5/2000 |
| JP | 2000-271204 | 10/2000 |
| JP | 2002-071204 | 3/2002 |
| JP | 2002-322448 | 11/2002 |
| KR | 10-0369453 | 1/2003 |
| MX | 2007008258 | 8/2007 |
| RU | 2160932 | 12/2000 |
| RU | 26272 | 11/2002 |
| WO | WO92/13901 | 8/1992 |
| WO | WO93/23496 | 11/1993 |
| WO | WO95/34263 | 12/1995 |
| WO | WO97/11996 | 4/1997 |
| WO | WO98/38547 | 9/1998 |
| WO | WO99/19415 | 4/1999 |
| WO | WO99/58421 | 11/1999 |
| WO | WO99/63400 | 12/1999 |
| WO | WO00/13887 | 3/2000 |
| WO | WO00/13888 | 3/2000 |
| WO | WO00/60407 | 10/2000 |
| WO | WO01/40853 | 6/2001 |
| WO | WO01/42325 | 6/2001 |
| WO | WO01/59024 | 8/2001 |
| WO | WO02/42832 | 5/2002 |
| WO | WO02/074874 | 9/2002 |
| WO | WO03/029002 | 4/2003 |
| WO | WO03/087251 | 10/2003 |
| WO | WO03/099953 | 12/2003 |
| WO | WO2004/061037 | 7/2004 |
| WO | WO2004/092295 | 10/2004 |
| WO | WO2005/085381 | 9/2005 |
| WO | WO2006/033925 | 3/2006 |
| WO | WO2006/076327 | 7/2006 |
| WO | WO2006/078038 | 7/2006 |
| WO | WO2006/106309 | 10/2006 |
| WO | WO2007/030583 | 3/2007 |
| WO | WO2008/057926 | 5/2008 |
| WO | WO2008/093333 | 8/2008 |
| WO | WO2008/124581 | 10/2008 |
| WO | WO2009/043975 | 4/2009 |
| WO | WO2010/027507 | 3/2010 |
| WO | WO2010/117771 | 10/2010 |
| WO | WO2010/117774 | 10/2010 |

OTHER PUBLICATIONS

Written Opinion for International Application Serial No. PCT/US2010/029169.

Wood et al., "5.1: Large Area, High Resolution Portable ZBD Display", SID 02 Digest, ISSN/002-0866X/02/3301-0022-$1.00 © 2002 SID, pp. 22-25.

Pentermann et al., Letters to Nature, "Single-substrate liquid-crystal displays by photo-enforced stratification", Nature/vol. 417/May 2, 2002/www.nature.com, © 2002 Maxmillan Magazines Ltd., pp. 55-58.

Polylactic Acid Technology; http://www.jimluntllc.com/pdfs/polylactic_acid_technology.pdf, Dated Feb. 11, 2005.

The Engineering Toolbox; http://engineeringtoolbox.com/linear-expansion-coefficients-d_95.html.

Wypych, George (2012), Handbook of Polymers . . . ChemTec Publishing, Online version available at: http://www.knovel.com.web.portal/browse/display?_EXT_KNOVEL_DISPLAY_bookid=5141&verticalID=0.

TOPAS 8007S datasheet, available at http://www.topas.com/sites/default/files/TDS_8007S_04_e_1.pdf (2014).

TOPAS 9506F-500 datasheet, available at http://www.topas.com/sites/default/files/TDS_9506F-500_e_0.pdf (2014).

International Preliminary Report on Patentability issued in corresponding IA No. PCT/US2010/029169 dated Jun. 1, 2011.

* cited by examiner

REMOVABLE ADHESIVE LABEL CONTAINING HIGH TENSILE MODULUS POLYMERIC FILM LAYER

CROSS-REFERENCE TO RELATED APPLICATION

The present application is a 371 of International Application No. PCT/US2010/029169, which published in English on Oct. 14, 2010, and claims priority to U.S. Provisional Patent Application No. 61/164,694 filed Mar. 30, 2009, both of which are incorporated herein by reference in their entireties.

BACKGROUND OF THE INVENTION

1. Field of the Invention

The present invention involves a removable adhesive label that contains a high tensile modulus polymeric film, a related labeled container, and a method of removing the label from a container. The label is useful in various labeling applications and especially in adhesive labeling applications involving reusable and recyclable containers.

2. Description of the Related Art

Labels are applied to numerous articles of commerce to convey information regarding a manufacturer and a product. Articles of commerce include plastic, paper, metal and glass containers for a multitude of consumer and industrial products such as for example bottled beverage industry products. A particularly demanding labeling application is for reusable and recyclable beverage bottles, especially for the bottled beer industry, where the label requirements generally include high clarity visual aesthetics, abrasion resistance during processing and handling of beverage bottles, resistance to any deleterious effects due to moisture during cold storage or a pasteurization process, and removability of the label from the bottle during a washing process in a warm or hot washing fluid such as for example a 50 to 90° C. aqueous caustic solution where the removed label does not clog the washing process equipment. The washing process allows the washed bottle to consequently be reused or recycled. The washed bottle offers the flexibility of being refilled and relabeled for any number of beverage products. Labels currently employed for reusable and recyclable beverage bottles include paper labels and stretched, thermally shrinkable polymeric labels. Paper labels lack high clarity visual aesthetics. Stretched, thermally shrinkable polymeric labels upon removal tend to curl up tightly into a needle shape which can clog washing process equipment. Labels meeting the requirements for the reusable and recyclable bottled beverage industry are desirable.

BRIEF SUMMARY OF THE INVENTION

An exemplary embodiment of the present invention is a label where the label comprises (a) a film having a first surface and a second surface and comprising a first film layer, and (b) an adhesive layer having a first surface and a second surface and comprising an adhesive where the first surface of the adhesive layer is adhesively joined to the second surface of the film, where the first film layer comprises at least one thermoplastic polymer, the first film layer has a tensile modulus (American Society for Testing and Materials, hereinafter "ASTM" D882) in a machine direction and/or a transverse direction of at least 900 MPa after immersion in water for 3 minutes, and the first film layer has an absolute areal dimensional change (ASTM D1204) of less than 5.0% after immersion in water at a temperature of about 80° C. for at least about 3 minutes.

Another exemplary embodiment is the above described label where (c)(iv) the thickness of the first film layer is greater than the thickness of the adhesive layer.

Another exemplary embodiment is the above described label where the first film layer has a water absorption (ASTM D570) of less than 2.1% by weight after immersion in water at a temperature of about 80° C. for at least about 2 hours.

Another exemplary embodiment is the above described label where the film is a monolayered film.

Another exemplary embodiment is the above described label where the film is a multilayered film.

Another exemplary embodiment is the above described label where the first film layer comprises two or more layers where each of said two or more layers of the first film layer has a tensile modulus (ASTM D882) in a machine direction and/or a transverse direction of at least 900 MPa after immersion in water at a temperature of about 80° C. for at least about 3 minutes and has an absolute areal dimensional change (ASTM D1204) of less than 4.9% after immersion in water at a temperature of about 80° C. for at least about 3 minutes.

Another exemplary embodiment is the above described label where the film comprises (d) a second film layer comprising at least one thermoplastic polymer where the second film layer has a property selected from the group consisting of a tensile modulus (ASTM D882) in a machine direction and a transverse direction below 900 MPa after immersion in water at a temperature of about 80° C. for at least about 3 minutes, an absolute areal dimensional change (ASTM D1204) of at least 4.9% after immersion in water at a temperature of about 80° C. for at least about 3 minutes, and a combination of the two foregoing properties.

Another exemplary embodiment is the above described label where the second film layer comprises two or more layers where each of said two or more layers of the second film layer has a property selected from the group consisting of a tensile modulus (ASTM D882) in a machine direction and a transverse direction below 900 MPa after immersion in water at a temperature of about 80° C. for at least about 3 minutes, an absolute areal dimensional change (ASTM D1204) of at least 4.9% after immersion in water at a temperature of about 80° C. for at least about 3 minutes, and a combination of the two foregoing properties.

Another exemplary embodiment is the above described label where the label comprises a release liner having a first surface and a second surface where the first surface of the liner is releasably attached to the second surface of the adhesive layer.

Another exemplary embodiment is a labeled container that includes the above described label and a container where (i) the label is attached to the container having a vertical axis and a horizontal axis where the second surface of the adhesive layer is adhesively joined to an outer surface of the container, (ii) the machine direction or the transverse direction of the first film layer circumferentially follows the horizontal axis of the container where the machine direction or the transverse direction that circumferentially follows the horizontal axis of the container has a tensile modulus (ASTM D882) of at least 900 MPa after immersion in water at a temperature of about 80° C. for at least about 3 minutes, and (iii) the label is removable from the container after immersion in a washing liquid where the temperature of the washing liquid is at least 50° C. and the label detaches from the container.

Another exemplary embodiment is a method of removing a label from a container that includes (i) providing the above described label, (ii) attaching the label to a circularly shaped container having a vertical axis and a horizontal axis where the horizontal axis of the circularly shaped container is parallel to the circumference of the container and the circumference of the container has a circular shape, the second surface of the adhesive layer is adhesively joined to an outer surface of the container, and the machine direction or the transverse direction of the first film layer circumferentially follows the horizontal axis of the container where the machine direction or the transverse direction that circumferentially follows the horizontal axis of the container has a tensile modulus (ASTM D882) of at least 900 MPa after immersion in water at a temperature of about 80° C. for at least about 3 minutes, and (iii) removing the label from the container by immersing the container with the attached label in a liquid where the temperature of the liquid is at least 50° C. and the label detaches from the container.

Other embodiments of the present invention will become apparent from the following Detailed Description of the Preferred Embodiments taken in conjunction with the accompanying Drawings and the appended Claims, all of which exemplarily illustrate the principles of the present invention, but do not limit the invention.

BRIEF DESCRIPTION OF THE DRAWINGS

The components in the figures of the appended drawings are not to scale. Components appearing in more than one figure have been given the same reference number to show the correspondence.

DETAILED DESCRIPTION OF THE PREFERRED EMBODIMENTS

Figure 4:
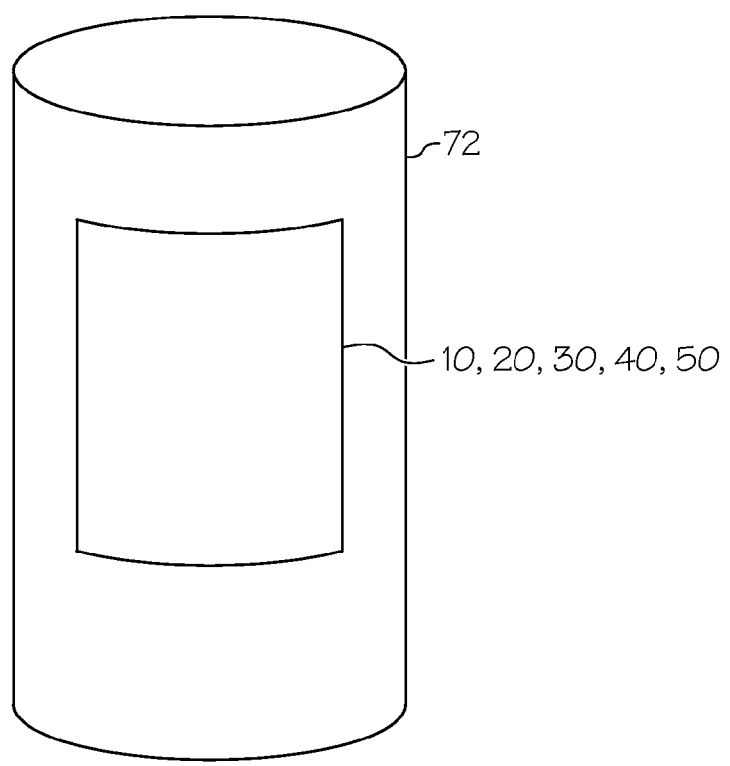
FIG. 4 is a perspective view of a label attached to a cylindrically shaped container according to a preferred embodiment.

Referring to FIG. 4, a label 10, 20, 30, 40 or 50 of the present invention is useful in commercial labeling applications that include labeling of articles of commerce such as for example plastic, paper, metal and glass containers 72 for a multitude of consumer and industrial products. The container can be any shaped container including a bottle, a jug, a jar or a drum. In an embodiment the container is a glass beverage bottle having a cylindrically shaped body that includes a beer bottle. The label, as described hereinbelow, on a labeled container has high clarity visual aesthetics, abrasion resistance during processing and handling of the container, resistance to any deleterious effects due to moisture during cold storage or a pasteurization process, and removability of the label from the container during a washing process in a warm or hot washing fluid that includes a 50 to 100° C. water bath or aqueous caustic solution where the removed label does not clog the washing process equipment.

First Film Layer

Figure 1A:
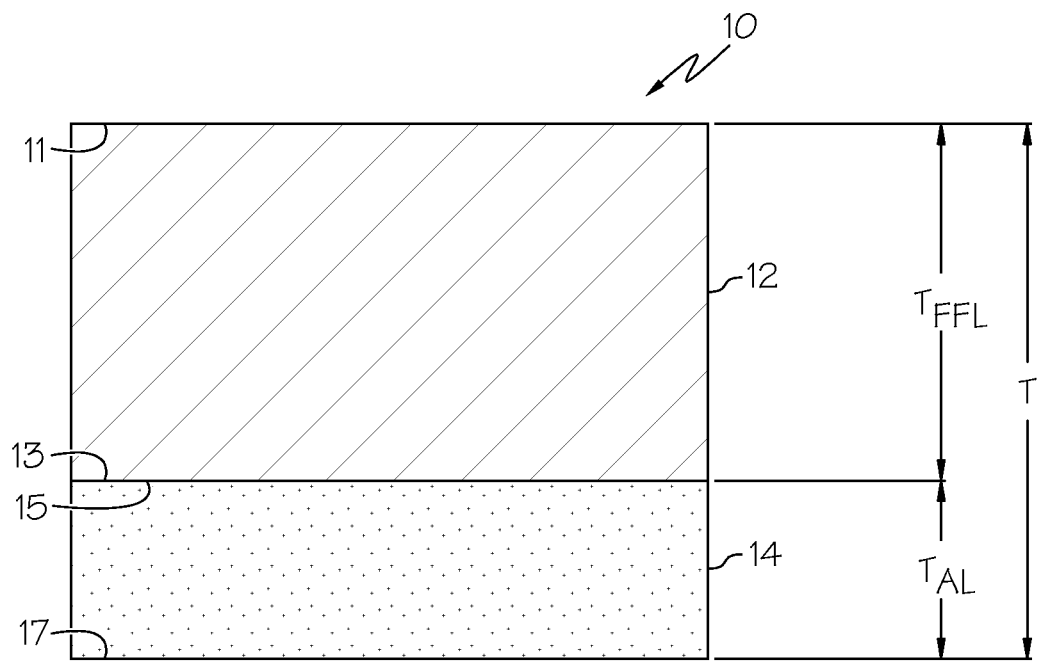
FIG. 1A is a sectional view of a label containing two layers according to a preferred embodiment.
Figure 1B:
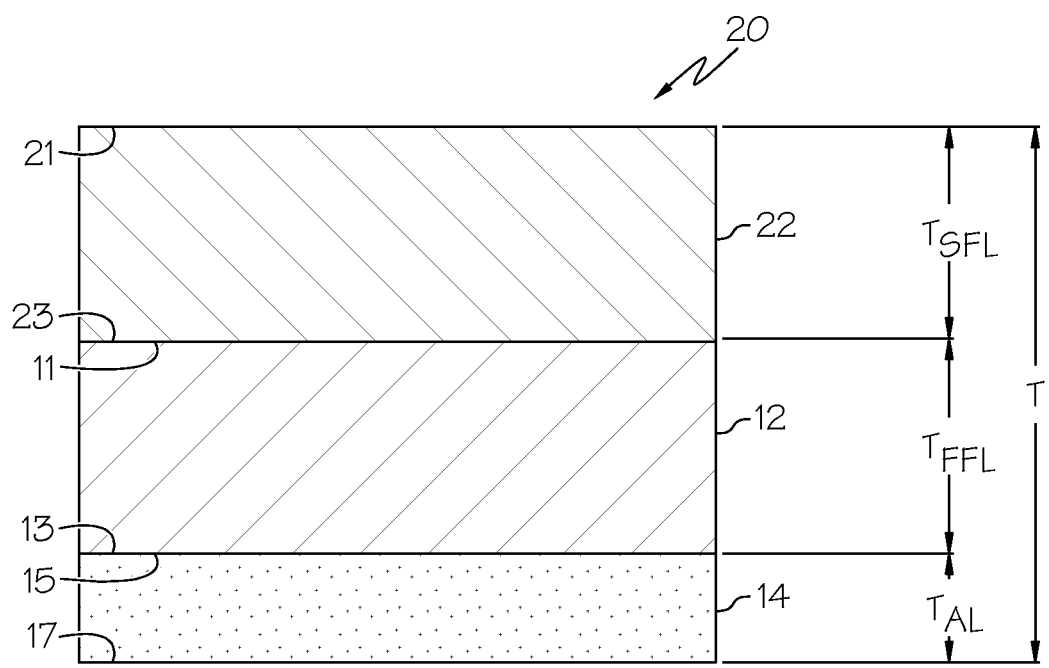
FIG. 1B is a sectional view of a label containing three layers according to a preferred embodiment.
Figure 1C:
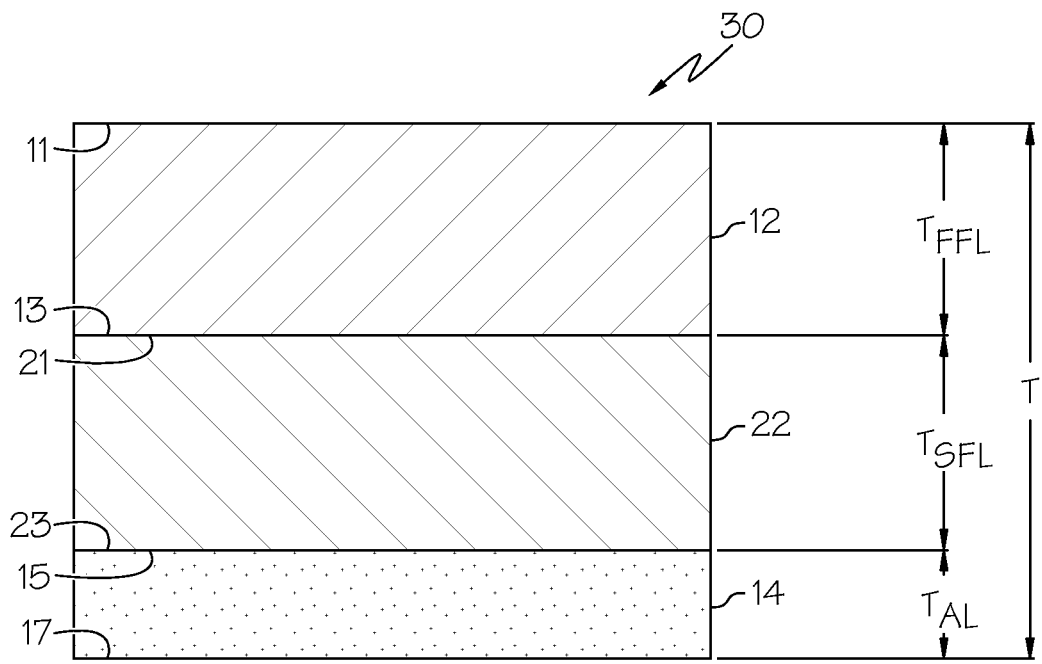
FIG. 1C is a sectional view of a label containing three layers according to a preferred embodiment.
Figure 1D:
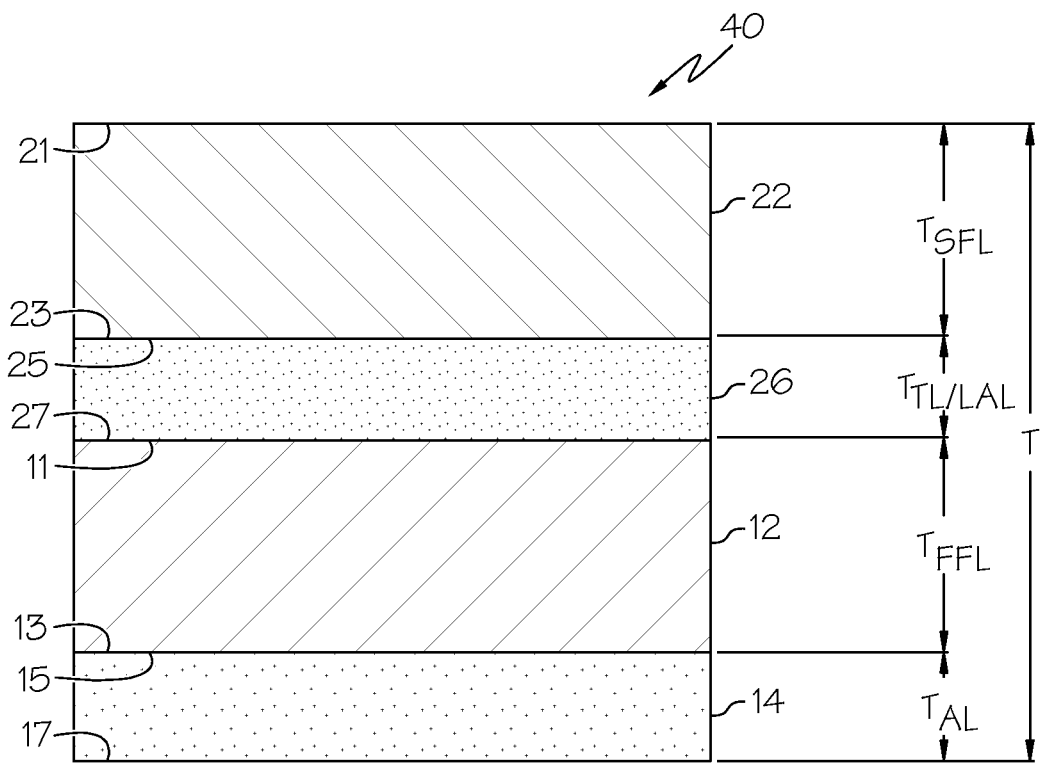
FIG. 1D is a sectional view of a label containing four layers according to a preferred embodiment.
Figure 1E:
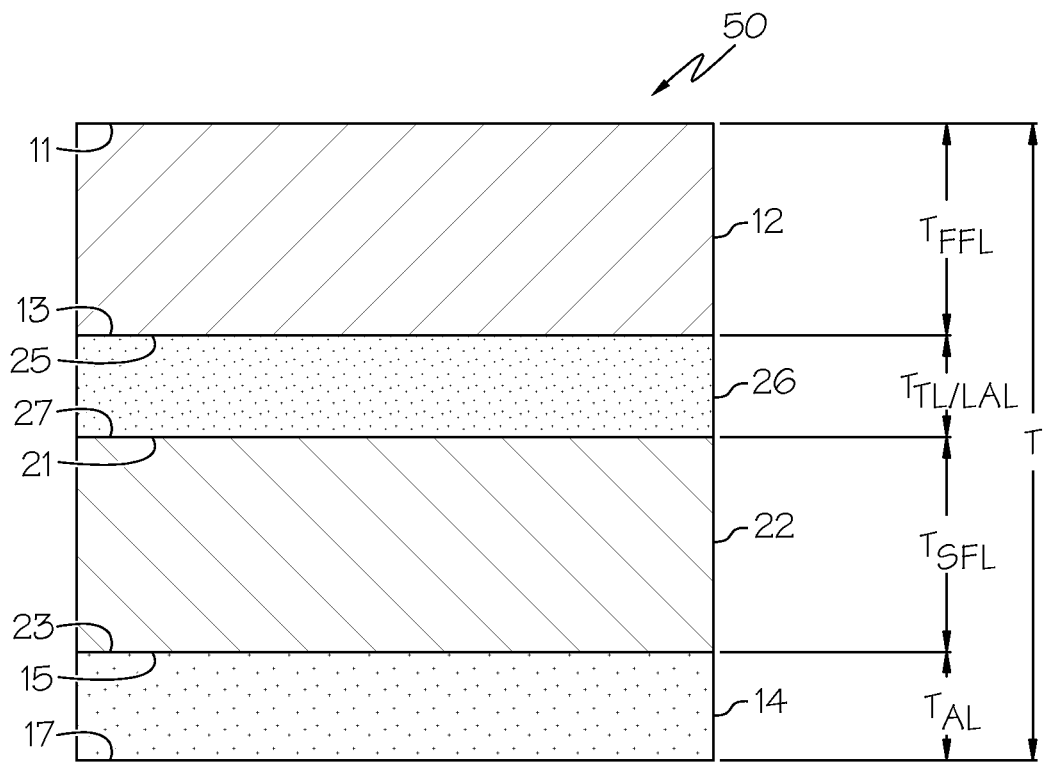
FIG. 1E is a sectional view of a label containing four layers according to a preferred embodiment.
Figure 2:
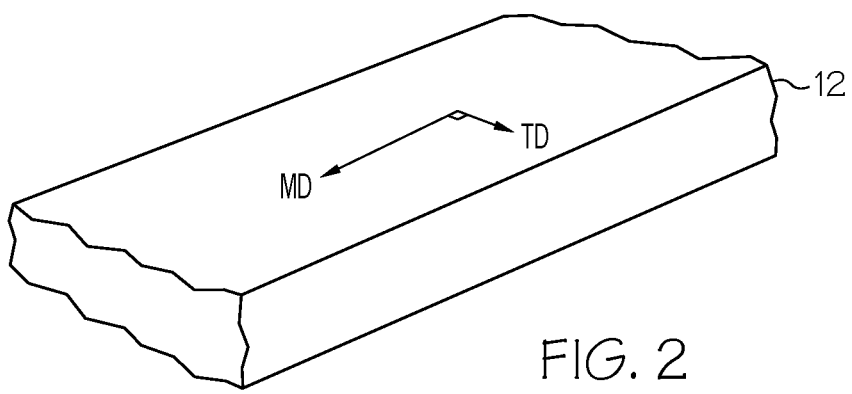
FIG. 2 is a perspective view of a first film layer of a label showing a machine direction and a transverse direction.

Referring to FIGS. 1A, 1B, 1C, 1D and 1E the labels 10, 20, 30, 40 and 50 of the present invention comprise a film that comprises a first film layer 12. The first film layer has a relatively high stiffness in terms of tensile modulus after immersion in warm or hot water. In embodiments the first film layer, after immersion in warm or hot water, has a relatively high stiffness in terms of tensile modulus in a machine direction, in a transverse direction, or in both a machine direction and a transverse direction. In embodiments of the invention the first film layer has an has a tensile modulus (ASTM D882) in a machine direction and/or a transverse direction of at least 900 MPa (megapascals), at least 1030 MPa, at least 1160 MPa, or at least 1260 MPa after immersion in water at a temperature of about 80° C. for at least about 3 minutes. Referring to FIG. 2, the first film layer 12 has three directions or dimensions to include a machine direction (MD) and a transverse direction (TD) where the machine direction is the direction that the first film layer is advanced during its manufacture and the transverse direction is the direction that is normal or perpendicular to the machine direction and the machine and transverse directions lie in the largest areal plane of the first film layer. The third direction or dimension of the first film layer is its thickness which is perpendicular to the areal plane containing the machine and transverse directions. The first film layer has a relatively low two-dimensional change in area as measured in the machine direction and the transverse direction after immersion in warm water. In embodiments the first film layer has an absolute areal dimensional change (ASTM D1204) of less than about 5.0%, less than 4.9%, less than 4.2% or less than 3.5% after immersion in water at a temperature of about 80° C. for at least about 3 minutes as measured in the machine direction and the transverse direction. The absolute areal dimensional change can be a shrinkage which results in a reduction in the area or can be an expansion which results in an increase in the area. Referring to FIGS. 1A, 1B and 1C the thickness $T_{FFL}$ of the first film layer is greater than the thickness $T_{AL}$ of an adhesive layer 14 of the label, and in other embodiments the thickness of the first film layer is at least 5% greater, at least 10% greater, at least 20% greater, at least 30% greater, at least 40% greater, at least 50% greater, or at least 60% greater than the thickness of the adhesive layer. The first film layer has a relatively low level of water absorption after immersion in warm water. In embodiments the first film layer has a water absorption (ASTM D570) on a weight basis of less than about 2.1%, less than 1.6%, or less than 1.2% after immersion in water at a temperature of about 80° C. for at least about 2 hours. In other embodiments the first film layer has a water absorption (ASTM D570) on a weight basis of 0.1 to 2%, 0.15 to 1.8%, or 0.2 to 1.6% after immersion in water at a temperature of about 80° C. for at least about 2 hours.

The first film layer comprises at least one thermoplastic polymer. In embodiments the at least one thermoplastic polymer of the first film layer comprises a polymer selected from the group consisting of a polyolefin, a (meth)acrylate polymer, a styrene polymer, a polyester, a halogen-containing polymer, a polycarbonate, a polyacrylonitrile, an aromatic polyether, an aromatic polyimide, an aromatic polyamide-imide, and a mixture of two or more of any of the foregoing polymers. In other embodiments the thermoplastic polymer of the first film layer comprises a polymer selected from the group consisting of an isotactic polypropylene homopolymer, an isotactic polypropylene random copolymer, a poly(alkyl methacrylate), a polystyrene homopolymer, an aromatic polycarboxylic acid based polyester, a polylactic acid, a polycarbonate, an aromatic polyetherketone, an aromatic polyetheretherketone, an aromatic polyether imide, an aromatic polysulfone, an aromatic polyethersulfone, a polyphenylsulfone, an aromatic polyimide, an aromatic polyamide-imide, and a mixture of two or more of any of the foregoing polymers. In other embodiments the thermoplastic polymer of the first film layer comprises a polymer selected from the group consisting of a poly(methyl methacrylate), a polystyrene homopolymer, a polycarbonate, an aromatic polyetherketone, an aromatic polyetheretherketone, an aromatic polyether imide, an aromatic polysulfone, an aromatic polyethersulfone, a polyphenylsulfone, an aromatic polyimide, an aromatic polyamide-imide, and a mixture of two or more of any of the foregoing polymers.

The polyolefin of the first film layer includes homopolymers and copolymers of olefins having 2 to 12 carbon atoms. The polyolefin includes isotactic polypropylene homopolymers having a density of 0.88 to 0.92 g/cm$^3$ and a melt flow rate (ASTM D1238) at 230° C./2.16 kg of 0.5 to 40 g/10 minutes and a melting point of 150 to 170° C., and isotactic polypropylene random copolymers having a density of 0.88 to 0.92 g/cm$^3$ and a melt flow rate (ASTM D1238) at 230° C./2.16 kg of 0.5 to 40 g/10 minutes and a melting point of 125 to 165° C. where the isotactic polypropylene random copolymer can contain on a weight basis 0.1 to 20% or 0.1 to 10% of at least one ethylene or $C_4$ to $C_{12}$ olefin comonomer. The polyolefins are generally prepared by a polymerization using a metal based catalyst to include a Ziegler-Natta or metallocene catalyst. Useful polyolefins include for example the isotactic polypropylene homopolymer P4G4K-173X, from Flint Hills Resources of Wichita, Kans., which has a density of 0.9 g/cm$^3$ and a melt flow rate (ASTM D1238) at 230° C./2.16 kg of 12 g/10 minutes, and the isotactic polypropylene random copolymer P5M4K-070X, from Flint Hills Resources, which has a density of 0.9 g/cm$^3$ and a melt flow rate (ASTM D1238) at 230° C./2.16 kg of 10 g/10 minutes and a 3.2% by weight ethylene comonomer content.

The (meth)acrylate polymer of the first film layer includes homopolymers of an alkyl acrylate or of an alkyl methacrylate, copolymers of two or more alkyl acrylates or of two or more alkyl methacrylates where the two or more alkyl acrylates or alkyl methacrylates differ in the number of carbon atoms in the alkyl group, copolymers of one or more alkyl acrylates and one or more alkyl methacrylates, and mixtures of two or more of any of the foregoing polymers. In an embodiment the (meth)acrylate polymer includes homopolymers of an alkyl methacrylate where the alkyl group has 1 to 12 or 1 to 8 or 1 to 4 carbon atoms and the alkyl methacrylate homopolymer has a density of 1.05 to 1.25 g/cm$^3$ and a melt flow rate (ASTM D1238) at 230° C./3.8 kg of 0.5 to 40 g/10 minutes. In an embodiment the (meth)acrylate polymer contains an impact modifier where the impact modifier is a polymeric elastomer which can be derived from an aromatic monomer to include for example styrene-butadiene rubber impact modifiers. The (meth)acrylate polymers are generally prepared by a catalyzed polymerization such as for example by free radical catalysis. Useful (meth)acrylate polymers include alkyl methacrylate homopolymers such as for example the Altuglas® and Plexiglas® poly(methyl methacrylate) resin series manufactured by Arkema Inc. of Philadelphia, Pa., and the Lucite® poly(methyl methacrylate) resin series manufactured by Lucite International of Parkersburg, W. Va.

The styrene polymer of the first film layer includes a homopolymer of styrene or a substituted styrene, a copolymer of styrene or a substituted styrene, or a mixture of two or more of any of the foregoing polymers. A substituted styrene includes a styrene substituted with one or more hydrocarbon groups, such as for example with a methyl group in alpha-methylstyrene, and/or substituted with one or more nonhydrocarbon groups such as for example with a sulfonic acid group in 4-styrenesulfonic acid. The copolymer of styrene or a substituted styrene includes copolymers of styrene or a substituted styrene with one or more monomers where the monomers include olefins, such as for example 1,3-butadiene, as found in for example styrene-butadiene copolymers. In embodiments the styrene polymer is an amorphous atactic polystyrene homopolymer which is prepared by free radical polymerization and has a glass transition temperature of 85 to 105° C. and a density of 1.02 to 1.06 g/cm$^3$ and a melt flow rate (ASTM D1238) at 200° C./5 kg of 0.5 to 40, a crystalline syndiotactic polystyrene homopolymer which is prepared by metallocene catalyzed polymerization and has a melting point of 260 to 280° C., or a mixture of two or more of any of the foregoing polymers. Useful styrene polymers include for example the polystyrene homopolymer resin STYRON® 693, from The Dow Chemical Company of Midland, Mich., which has a specific gravity (ASTM D792) of 1.04 and a melt flow rate (ASTM D1238) at 200° C./5 kg of 3.4 g/10 minutes and a tensile modulus (ASTM D638) of 2882 MPa, and the syndiotactic polystyrene homopolymer Xarec® series from Idemitsu Chemical which is available through Polymer Technology & Services, LLC of Murfreesboro, Tenn.

The polyester of the first film layer includes polymers derived from at least one polycarboxylic acid or derivative thereof, to include ester derivatives, and at least one polyol, or derived from at least one hydroxy-containing carboxylic acid or derivative thereof, to include cyclic lactone derivatives, where the hydroxy-containing carboxylic acid has two or more carbon atoms. The polycarboxylic acid has two or more carbon atoms and two or more carboxylic acid groups. In embodiments the polycarboxylic acid includes a polycarboxylic acid selected from the group consisting of an aliphatic polycarboxylic acid, an aromatic polycarboxylic acid, and a mixture of two more of any of the foregoing polycarboxylic acids. Aromatic polycarboxylic acids include for example terephthalic acid and 2,6-naphthalenedicarboxylic acid. Polyols include alcohols having two or more hydroxy groups to include for example ethylene glycol, 1,3-propanediol, and 1,4-butanediol. Generally an ester monomer formed from a polycarboxylic acid and a polyol is reacted in a polycondensation to form a high molecular weight polyester. In an embodiment the polyester includes an aromatic polycarboxylic acid based polyester. The hydroxy-containing carboxylic acid includes for example lactic acid where its cyclic lactide monomer derivative can undergo a polycondensation using a metal cation catalyst to form a polylactic acid also known as a polylactide. Useful polyesters include for example poly(ethylene 2,6-naphthalenedicarboxylate) resins, terephthalic acid based polyesters including poly(1,3-propylene terephthalate) resins, poly(1,4-butylene terephthalate) resins and the poly(ethylene terephthalate) resin Eastapak® 9921 PET, from Eastman Chemical Company of Kingsport, Tenn., which has a density of 1.32 g/cm$^3$ and a melting point of 243° C., and the polylactic acid PLA Polymer 4042D, from NatureWorks® LLC of Minnetonka, Minn., which has a density of 1.24 g/cm$^3$ and a melt temperature of 202 to 218° C.

The halogen-containing polymer of the first film layer includes poly(vinyl or vinylidene halide)s such as for example poly(vinyl chloride)s and poly(vinylidene fluoride)s. Useful halogen-containing polymers include for example the poly(vinyl chloride) resin Geon™ Vinyl Rigid Extrusion L0259, from PolyOne Corporation of Cleveland, Ohio, which has a specific gravity of 1.34 and melt temperature of 188° C.

The polycarbonate of the first film layer includes polymers that have repeating hydrocarbon based groups linked together by carbonate groups which are also known as carbonyldioxy groups. In an embodiment the polycarbonate has a density of 1.1 to 1.32 g/cm$^3$ and a melt flow rate (ASTM D1238) at 300° C./1.2 kg of 0.5 to 40 g/10 minutes. In embodiments the polycarbonate includes an aromatic polycarbonate, a nonaromatic polycarbonate, or a mixture of two or more of any of the foregoing polycarbonates. The nonaromatic polycarbonates include polymers which can be prepared by metal catalyzed reaction of an epoxide with carbon dioxide. The aromatic polycarbonates include polymers which can be prepared by reaction of a polyhydroxy-substituted arene, to include for example bisphenol A also known as 4,4'-isopropylidenediphenol, with phosgene or a dialkyl or diaryl carbonate to include for example dimethyl carbonate. Arenes are aromatic unsaturated cyclic hydrocarbons. Useful polycarbonates include for example the polycarbonate Makrolon® 1804, from Bayer Material Science of Baytown, Tex., which has a density of 1.2 g/cm$^3$ and a melt flow rate (ASTM D1238) at 300° C./1.2 kg of 6.5 g/10 minutes, and the polycarbonate Lupilon® S3000R, from Mitsubishi Chemical and available through Polymer Technology & Services, LLC of Murfreesboro, Tenn., which has a density of 1.2 g/cm$^3$ and a melt flow rate (ASTM D1238) at 300° C./1.2 kg of 16.5 g/10 minutes and is made from bisphenol A.

The polyacrylonitrile of the first film layer includes a polyacrylonitrile homopolymer, a polyacrylonitrile copolymer, or a mixture of two or more of any of the foregoing polymers. The polyacrylonitrile copolymer includes polymers prepared from acrylonitrile and one or more comonomers where the comonomers include an olefin, a halogen-substituted olefin, an aryl-substituted olefin, or a mixture of two or more of any of the foregoing comonomers. Useful polyacrylonitriles include acrylonitrile-butadiene copolymer resins, acrylonitrile-styrene copolymer resins, and acrylonitrile-butadiene-styrene copolymer resins such as for example the acrylonitrile-butadiene-styrene or ABS copolymer resin TRILAC™ ABS-EX1000, from Polymer Technology & Services, LLC of Murfreesboro, Tenn., which is a high impact extrusion grade resin having a melt flow rate (ASTM D1238) at 220° C./10 kg of 7 g/10 minutes.

The aromatic polyether of the first film layer includes high molecular weight thermoplastic polymer resins having aromatic groups where the aromatic groups are linked together by oxygen atoms in two or more ether linkages. In embodiments the aromatic polyether has a number average molecular weight ranging from 1,000 to 1,000,000, from 2,000 to 500,000, from 3,000 to 250,000, or from 4,000 to 200,000. In embodiments the aromatic polyether includes one or more additional linkages selected from the group consisting of a sulfone linkage, a ketone linkage, an imide linkage, an amide linkage, a carboxylate ester linkage, a carbonate linkage, a sulfide linkage, an amine linkage, a carbamate ester linkage, and a mixture of two or more of any of the foregoing linkages. In other embodiments the aromatic polyether includes an aromatic polyether selected from the group consisting of an aromatic polyether ketone, an aromatic polyetheretherketone, an aromatic polyether imide, an aromatic polysulfone, an aromatic polyethersulfone, a polyphenylsulfone, and a mixture of two or more of any of the foregoing aromatic polyethers. Aromatic polyether ketones include polymers prepared from a condensation of a di(haloaryl)ketone, for example 4,4'-difluorobenzophenone, and a di(hydroxyaryl) ketone, for example 4,4'-dihydroxybenzophenone, in the presence of a base, for example potassium carbonate. Aromatic polyetheretherketones include polymers prepared from a condensation of a polyhydroxy-substituted arene, for example hydroquinone, and a di(haloaryl)ketone, for example 4,4'-difluorobenzophenone, in the presence of a base. Aromatic polyether imides include polymers prepared from a condensation of a bisimide, for example the bisimide formed from reacting 2 moles of 4-nitrilophthalic anhydride and 1 mole of 1,3-phenylenediamine, and a polyhydroxy-substituted arene, for example bisphenol A, in the presence of a base. Aromatic polysulfones include polymers prepared from a condensation of a di(haloaryl)sulfone, for example 4,4'-dichlorodiphenyl sulfone, and a polyhydroxy-substituted arene, for example bisphenol A, in the presence of a base. Aromatic polyethersulfones include polymers prepared from a condensation of a di(haloaryl)sulfone, for example 4,4'-dichlorodiphenyl sulfone, and a di(hydroxyaryl)sulfone, for example 4,4'-dihydroxydiphenyl sulfone, in the presence of a base. Polyphenyl sulfones include polymers prepared from a condensation of a di(haloaryl)sulfone, for example 4,4'-dichlorodiphenyl sulfone, and a polyhydroxy-substituted arene having two or more phenyl rings, for example 4,4'-biphenol, in the presence of a base. Useful aromatic polyethers include for example aromatic polyetheretherketone resins from Zeus Industrial Products of Orangeburg, S.C., aromatic polyether imide Ultem® resins from Sabic Innovative Plastics of Pittsfield, Mass., and aromatic polysulfone and aromatic polyethersulfone and polyphenylsulfone Ultrason® resins from BASF Corporation of Wyandotte, Mich.

The aromatic polyimide of the first film layer includes high molecular weight thermoplastic polymer resins having aromatic groups where the aromatic groups are linked together in two or more imide linkages. In embodiments the aromatic polyimide has a number average molecular weight ranging from 1,000 to 1,000,000, from 2,000 to 500,000, from 3,000 to 250,000, or from 4,000 to 200,000. In an embodiment the aromatic polyimide includes one or more additional linkages selected from the group consisting of a sulfone linkage, a ketone linkage, a carboxylate ester linkage, a carbonate linkage, a sulfide linkage, an amine linkage, a carbamate ester linkage, and a mixture of two or more of any of the foregoing linkages. Aromatic polyimides include polymers prepared from a condensation of an aromatic tetracarboxylic anhydride, for example pyromellitic dianhydride, and an aromatic diamine, for example 1,4-phenylenediamine. Useful aromatic polyimides include for example the aromatic polyimide EXTEM® resins from Sabic Innovative Plastics.

The aromatic polyamide-imide of the first film layer includes high molecular weight thermoplastic polymer resins having aromatic groups where the aromatic groups are linked together in two or more linkages where the linkages include at least one amide linkage and at least one imide linkage. In embodiments the aromatic polyamide-polyimide has a number average molecular weight ranging from 1,000 to 1,000,000, from 2,000 to 500,000, from 3,000 to 250,000, or from 4,000 to 200,000. In an embodiment the aromatic polyamide-polyimide includes one or more additional linkages selected from the group consisting of a sulfone linkage, a ketone linkage, a carboxylate ester linkage, a carbonate linkage, a sulfide linkage, an amine linkage, a carbamate ester linkage, and a mixture of two or more of any of the foregoing linkages. Aromatic polyamide-imides include polymers prepared from a condensation of an aromatic dicarboxylic anhydride carboxylic acid halide, for example trimellitic anhydride acid chloride, and an aromatic diamine, for example 4,4'-methylenedianiline. Useful aromatic polyamide-imides include for example the aromatic polyamide-imide Torlon® resins from Solvay Advanced Polymers, LLC of Alpharetta, Ga.

The film or a film layer or film layers of the film, to include the first film layer, can contain one or more additives to improve processing during film manufacture and during conversion to a label and to improve label end use performance. The additives include a nucleating agent, an antiblocking agent, a processing aid, a slip agent, an antistatic agent, a pigment, a cavitating agent, an inorganic filler, a heat stabilizer, an antioxidant, a flame retardant, an acid acceptor, a visible and/or ultraviolet light stabilizer, or a mixture of two or more of any of the foregoing additives. The additives can be present in the above described thermoplastic polymers as supplied by a vendor or can be introduced into the film or a film layer as an additive concentrate where the additive is present generally in a relatively large amount of 2 to 90% by weight, depending on its use, in the concentrate with a thermoplastic polymer carrier. The additives, depending on their use, can be present in the film or a film layer from 0.001% to 90% by weight. Additives for use in the film or a film layer are further described in U.S. Pat. No. 6,821,592 to Rodick and U.S. Pat. No. 7,217,463 to Henderson.

In an embodiment the first film layer is monolayered and has only one layer. In another embodiment the first film layer is multilayered and has two or more layers. In embodiments the one layer of the monolayered first film layer or each of the two or more layers of the multilayered first film layer has a tensile modulus (ASTM D882) in a machine direction and/or a transverse direction of at least 900 MPa, at least 1030 MPa, at least 1160 MPa, or at least 1260 MPa after immersion in water at a temperature of about 80° C. for at least about 3 minutes and has an absolute areal dimensional change (ASTM D1204) of less than 5.0%, less than 4.9%, less than 4.2%, or less than 3.5% after immersion in water at a temperature of about 80° C. for at least about 3 minutes. In embodiments the thickness of the one layer of the monolayered first film layer or the thickness of the two or more layers of the multilayered first film layer in combination is greater than the thickness of the adhesive layer, or the thickness of the one layer of the monolayered first film layer or the thickness of the two or more layers of the multilayered first film layer in combination is at least 5%, at least 10%, at least 20%, at least 30%, at least 40%, at least 50%, or at least 60% greater than the thickness of the adhesive layer. In other embodiments the one layer of the monolayered first film layer or each of the two or more layers of the multilayered first film layer has a water absorption (ASTM D570) on a weight basis of less than 2.1%, less than 1.6%, or less than 1.2% after immersion in water at a temperature of about 80° C. for at least about 2 hours. In other embodiments the one layer of the monolayered first film layer or each of the two or more layers of the multilayered first film layer has a water absorption (ASTM D570) on a weight basis of 0.1 to 2%, 0.15 to 1.8%, or 0.2 to 1.6% after immersion in water at a temperature of about 80° C. for at least about 2 hours. In an embodiment the first film layer, as described hereinabove, can contain one or more other thermoplastic polymers provided that the first film layer maintains its tensile modulus and dimensional change and water absorption properties as described hereinabove.

Second Film Layer

Referring to FIGS. 1B, 1C, 1D and 1E the labels 20, 30, 40 and 50 of the present invention comprise a film that comprises a second film layer 22. The second film layer compared to the first film layer, after immersion in water at a temperature of about 80° C., has a lower tensile modulus in a machine direction and/or a transverse direction or a greater two-dimensional change in area as measured in a machine direction and a transverse direction or a combination of the lower tensile modulus and the greater two-dimensional change in area. In embodiments the second film layer has a property selected from the group consisting of a tensile modulus (ASTM D882) in a machine direction and a transverse direction below 900 MPa or below 1030 MPa or below 1160 MPa or below 1260 MPa after immersion in water at a temperature of about 80° C. for at least about 3 minutes, an absolute areal dimensional change (ASTM D1204) of at least 4.9% or at least 4.2% or at least 3.5% after immersion in water at a temperature of about 80° C. for at least about 3 minutes, and a combination of the two foregoing properties. In other embodiments the second film layer has a water absorption (ASTM D570) on a weight basis of less than 0.1%, less than 0.15%, or less than 0.2% or in the alternative of more than 2.1%, more than 2%, more than 1.8%, or more than 1.6% after immersion in water at a temperature of about 80° C. for at least about 2 hours.

The second film layer comprises at least one thermoplastic polymer. In embodiments the at least one thermoplastic polymer of the second first film layer comprises a polymer selected from the group consisting of a polyolefin where the polyolefin includes homopolymers and copolymers of olefins having 2 to 12 carbon atoms, a (meth)acrylate polymer to include for example poly(alkyl acrylate)s, a styrene polymer, a polyester, a halogen-containing polymer, a polyacrylonitrile, a polyamide, a poly(vinyl alcohol), an olefin-vinyl carboxylate copolymer to include for example ethylene-vinyl acetate copolymers, an olefin-vinyl alcohol copolymer, a polyurethane, a cellulosic based polymer, an olefin-(meth) acrylic acid copolymer to include for example ethylene-methacrylic acid copolymers, a cyclic olefin homopolymer, a cyclic olefin copolymer, a metal salt of an olefin-(meth) acrylic acid copolymer to include for example zinc or sodium salts of ethylene-methacrylic acid copolymers, and a mixture of two or more of any of the foregoing polymers. In other embodiments the at least one thermoplastic polymer of the second first film layer comprises a polyethylene, a polyamide, an olefin-vinyl alcohol copolymer, a cyclic olefin copolymer, and a mixture of two or more of any of the foregoing polymers.

The polyethylene of the second film layer includes polymers selected from the group consisting of a polyethylene homopolymer, a polyethylene copolymer, and a mixture of two or more of any of the foregoing polymers. The polyethylene of the second film layer has a density of 0.86 to 0.98 and a melt index (ASTM D1238) at 190° C./2.16 kg of 0.5 to 40 g/10 minutes. The polyethylene copolymers include polymers prepared from ethylene and an olefin comonomer having 3 to 12 carbon atoms where the comonomer content on a weight basis is 0.1 to 45%. Useful polyethylenes include for example the high density polyethylene resin Alathon® M6030, from Equistar Chemicals, LP of Houston, Tex., which has a density of 0.96 g/cm$^3$ and a melt index (ASTM D1238) at 190° C./2.16 kg of 3 g/10 minutes.

The polyamide of the second film layer includes polymers selected from the group consisting of a nonaromatic polyamide, an aromatic polyamide, and mixtures of two or more of any of the foregoing polymers. Nonaromatic polyamides do not contain repeating aromatic groups while aromatic polyamides contain only repeating aromatic groups or contain both repeating aromatic groups and repeating nonaromatic groups. Polyamides can be prepared by a condensation of an amino carboxylic acid or an amino carboxylic acid halide monomer, by a ring opening polymerization of a lactam to include for example a ring opening polymerization of caprolactam to form polycaprolactam or nylon 6, or by a condensation of a polyamine monomer and a polycarboxylic acid or polycarboxylic acid halide monomer to include for example the condensation of 1,6-hexanediamine and adipic acid or adipic acid chloride to form the polyamide nylon 66. Useful polyamides include for example the nonaromatic nylon 6 and nylon 66 Ultramid® resins from BASF Corporation of Florham Park, N.J. and the aromatic nylon MXD6 resins from Mitsubishi Gas Chemical American, Inc. of New York, N.Y. where the nylon MXD6 resins are derived from meta-xylylenediamine and adipic acid or an adipic acid halide.

The olefin-vinyl alcohol copolymer of the second film layer includes at least one copolymer of an olefin monomer containing 2 to 12 carbon atoms and a vinyl alcohol monomer where the vinyl alcohol monomer is usually derived from vinyl acetate and the olefin content of the olefin-vinyl alcohol copolymer ranges on a mole basis from 5% to 80%, 12% to 68%, or 20% to 55%. Useful olefin-vinyl alcohol copolymers include for example the ethylene-vinyl alcohol copolymer EVAL® resins from EVAL Americas of Houston, Tex.

The cyclic olefin copolymer of the second film layer includes at least one copolymer of a cyclic olefin monomer and an olefin monomer that contains 2 to 12 carbon atoms where the cyclic olefin monomer content of the cyclic olefin copolymer on a weight basis ranges from 5% to 95%, 27% to 90%, or 50% to 90%. Useful cyclic olefin copolymers include for example the cyclic olefin copolymer TOPAS® resins from TOPAS Advanced Polymers, Inc. of Florence, Ky. where the TOPAS® resins are derived from norbornene and ethylene.

The second film layer can contain, as described hereinabove for the first film layer, one or more additives. In an embodiment the second film layer is monolayered and has only one layer. In another embodiment the second film layer is multilayered and has two or more layers. In embodiments the one layer of the monolayered second film layer or each of the two or more layers of the multilayered second film layer has a property selected from the group consisting of a tensile modulus (ASTM D882) in a machine direction and a transverse direction below 900 MPa or below 1030 MPa or below 1160 MPa or below 1260 MPa after immersion in water at a temperature of about 80° C. for at least about 3 minutes, an absolute areal dimensional change (ASTM D1204) of at least 5.0%, at least 4.9%, or at least 4.2% or at least 3.5% after immersion in water at a temperature of about 80° C. for at least about 3 minutes, and a combination of the two foregoing properties. In other embodiments the one layer of the monolayered second film layer or each of the two or more layers of the multilayered second film layer has a water absorption (ASTM D570) on a weight basis of less than 0.1%, less than 0.15%, or less than 0.2% or in the alternative of more than 2.1%, more than 2%, more than 1.8%, or more than 1.6% after immersion in water at a temperature of about 80° C. for at least about 2 hours. In an embodiment the second film layer, as described hereinabove, can contain one or more other thermoplastic polymers provided that the second film layer maintains its tensile modulus or dimensional change or water absorption properties or a combination of these properties as described hereinabove.

Adhesive Layer

Referring to FIGS. 1A, 1B, 1C, 1D and 1E the labels 10, 20, 30, 40 and 50 of the present invention comprise an adhesive layer 14. The adhesive layer comprises an adhesive where the adhesive includes an adhesive selected from the group consisting of a natural adhesive, a synthetic adhesive, and a mixture of two or more of any of the foregoing adhesives. Synthetic adhesives include pressure sensitive adhesives. In an embodiment the adhesive of the adhesive layer is a pressure sensitive adhesive. A pressure sensitive adhesive is an adhesive that forms a bond between the adhesive and an adherend, to include for example where the adherend is a polymeric film or a container, with the application of pressure. Pressure sensitive adhesives (PSAs) include acrylic-based PSAs, rubber-based PSAs, and silicone-based PSAs. In an embodiment the adhesive of the adhesive layer is an acrylic-based pressure sensitive adhesive. Pressure sensitive adhesives include emulsion or water-based PSAs, solvent-based PSAs, and solid PSAs which are water-free and solvent-free to include for example hot melt pressure sensitive adhesives. In an embodiment the adhesive of the adhesive layer is an emulsion acrylic-based pressure sensitive adhesive. In several embodiments the adhesive of the adhesive layer, to include for example a pressure sensitive adhesive, has a property selected from the group consisting of a decrease in adhesion strength at elevated temperatures generally above a room or ambient temperature, a decrease in adhesion strength on contact with an aqueous caustic solution such as for example an aqueous caustic soda solution, and a combination of the two foregoing properties. In other embodiments the adhesive of the adhesive layer is used on a dry weight coating basis at 5 to 40 $g/m^2$ (grams per square meter), 8 to 35 $g/m^2$, or 10 to 30 $g/m^2$. Pressure sensitive adhesives are described in *Encyclopedia of Polymer Science and Engineering*, Vol. 13, Wiley-Interscience Publishers, New York, 1988 and in *Polymer Science and Technology*, Vol. 1, Interscience Publishers, New York, 1964. Useful adhesives are available from H. B. Fuller Company of Saint Paul, Minn. and Henkel Corporation of Gulph Mills, Pa.

Release Liner/Other Components

Figure 3:
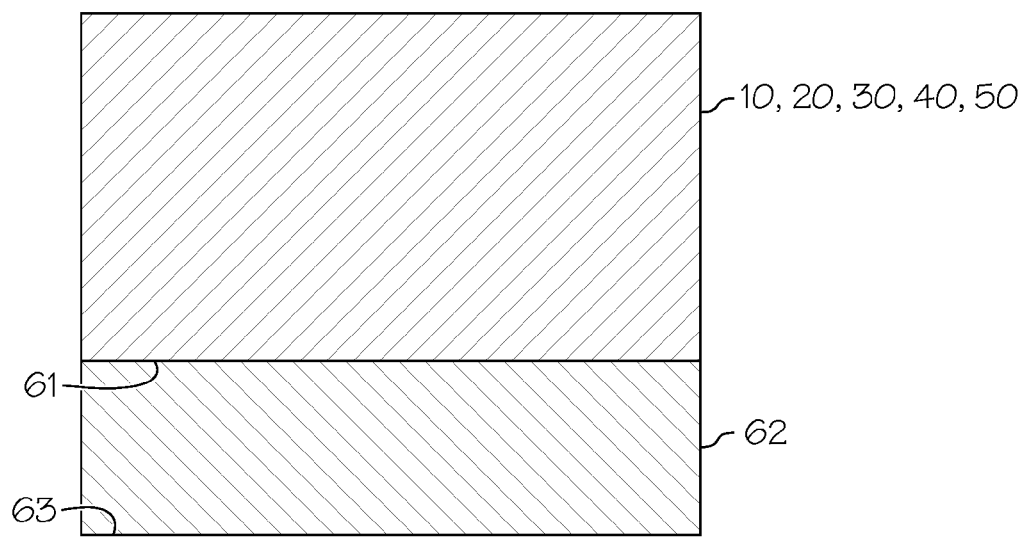
FIG. 3 is a sectional view of a label containing a release liner according to a preferred embodiment.

Referring to FIG. 3 the labels 10, 20, 30, 40 and 50 of the present invention can include a release liner 62. The release liner can be monolayered having only one layer or can be multilayered having two or more layers. The layer or layers of the release liner can include a layer selected from the group consisting of a paper layer to include for example a calendered glassine paper layer, a polymeric layer to include for example a polyolefin-based layer or a poly(ethylene terephthalate)-based layer, and in the case of a multilayered release liner a combination of two or more of any of the foregoing layers. The release liner has a first surface 61 and a second surface 63 and normally includes a release coating on at least the first surface of the release liner. The release coating, to include for example an organosiloxane polymer release coating also known as a silicone release coating, allows the release liner to be releasably attached to the adhesive layer of the label so that the release liner can be removed from the adhesive layer of the label during a labeling process leaving the adhesive layer adhesively joined to the film of the label.

Multilayered films of the label of the present invention can include one or more tie layers and/or one or more lamination adhesive layers. Referring to FIGS. 1D and 1E the labels 40 and 50 can include at least one layer 26 which can be a tie layer or a lamination adhesive layer. When present in the label a tie layer is located between two layers of the film and generally functions to improve adherence between the two layers of the film. Depending on the compositions of the two layers of the film which the tie layer is located between, the tie layer can include at least one thermoplastic polymer selected from the group consisting of a polyolefin to include for example ethylene and propylene homopolymers and copolymers, an unsaturated carboxylic acid or anhydride grafted polyolefin to include for example maleic anhydride grafted polypropylenes and maleic anhydride grafted polyethylenes, an alkene-unsaturated carboxylic acid or unsaturated carboxylate ester copolymer to include for example ethylene-alkyl methacrylate copolymers and ethylene-vinyl acetate copolymers, a metal salt of an alkene-unsaturated carboxylic acid copolymer to include for example ionomers which are sodium or zinc salts of ethylene-methacrylic acid copolymers, a styrene homopolymer or copolymer, a cyclic olefin homopolymer or copolymer, a halogen-containing polymer, a polyurethane, a polycarbonate, a polyacrylonitrile, a polyamide, an aromatic polyether, an aromatic polyimide, an aromatic polyamide-imide, a (meth)acrylate polymer, a polyester to include for example poly(ethylene terephthalate)s, a hydrocarbon resin to include for example hydrogenated polyterpene resins, and a mixture of two or more of any of the foregoing polymers.

The film of the label of the present invention can include one or more coatings, also known as topcoats, on its first and second surfaces to enhance adhesion of a printing ink or an adhesive to the film or to provide protection including for example from abrasion and/or moisture. The coating can be an ink-receptive or adhesive-receptive material to include for example an acrylic primer or an abrasion or moisture resistant material to include for example a polyolefin or polyester where the coating can be applied in a liquid form and dried or allowed to dry.

Label Processing

The film and label of the present invention can be prepared by one or more steps that include steps selected from the group consisting of an extrusion of a single layer, a coextrusion of two or more layers, a lamination of two or more layers, an application of one or more coatings, and a combination of two or more of any of the foregoing steps. The extrusion or coextrusion steps can be done through linear dies or annular dies. In an embodiment the film is monolayered and contains a monolayered first film layer which is formed by an extrusion step. In embodiments the film is multilayered and contains a multilayered first film layer which is formed by a coextrusion step, by a combination of extrusion and lamination steps, or by a combination of extrusion and coextrusion and lamination steps. In other embodiments the film is multilayered and contains a first film layer and a second film layer where the first film layer can be monolayered or multilayered and the second film layer can be monolayered or multilayered. The second film layer can be formed separately from the first film layer or together with the first film layer by one or more steps as described above for the film, label, and the monolayered and multilayered first film layer. In an embodiment a multilayered film contains a two-layered first film layer where each of the two layers is formed by an extrusion step and then the first film layer is formed by a lamination step. The lamination can be done by bringing layers together usually under pressure with or without heat and with or without a lamination adhesive. Lamination adhesives include for example polyurethane based adhesives and acrylic based adhesives such as acrylic based permanent pressure sensitive adhesives. In an embodiment the lamination is done by bringing layers together at a pressure of 69 to 690 KPa (kilopascals) at an ambient temperature of 23° C. with a lamination adhesive, a polyurethane based adhesive, between the layers. In an embodiment a multilayered film contains a monolayered first film layer and a monolayered second film layer where each layer is formed by an extrusion step and then the multilayered film is formed by a lamination step. In an embodiment a multilayered film contains a multilayered first film layer that contains six layers where five of the layers are formed by a coextrusion step, the sixth layer is formed by an extrusion step, and the multilayered film is formed by lamination of the coextruded layers with the extruded layer.

In an embodiment the film is nonoriented or not stretched. In other embodiments the film is oriented or stretched uniaxially in one direction, which can be the machine direction or the transverse direction, or the film is oriented biaxially in two directions which are usually the machine direction and the transverse direction. Orienting or stretching is stretching the film or layers of the film to align the polymer chains of the thermoplastic polymer or polymers, present in the film or layers of the film, in the direction of the stretching. The stretching results in the film or layers of the film having an increase in length and consequently a decrease in thickness. Although the stretching can be done at any temperature, it is usually done at an elevated temperature near the softening temperature of the polymer or polymers. The stretching generally increases the stiffness or tensile modulus (ASTM D882) of the film or layers of the film in the direction of the stretching. In embodiments the film or layers of the film can be oriented by stretching them uniaxially or biaxially in a stretch ratio range of 2 to 12, 3 to 10, or 4 to 8 where the stretch ratio is the ratio of the film length after stretching to the film length before stretching. In order to provide dimensional stability to an oriented film or layers of the film so they do not shrink or distort appreciably especially when exposed to elevated temperatures, the oriented film or layers of the film are annealed or heat set by heating the tensioned film or layers of the film near the softening temperature of the constituent polymer or polymers. In embodiments the annealed film or layers of the film have a linear shrinkage (ASTM D1204) at 100° C. in the machine direction and the transverse direction of less than 5%, less than 4.9%, less than 4.8%, or less than 3%. In an embodiment the film is a monolayered film and has only one layer. In an embodiment the film is a multilayered film and has two or more layers. In embodiments the first film layer is monolayered where the first film layer is nonoriented or is oriented and annealed. In embodiments the multilayered film contains a multilayered first film layer where the multilayered first film layer has two or more layers where all the layers of the first film layer are nonoriented, all the layers of the first film layer are oriented and annealed, or part of the layers of the first film layer are oriented and annealed where part of the layers of the first film layer includes at least one layer of the first film layer but not all the layers of the first film layer. In embodiments the multilayered film has a first film layer and a second film layer where both the first film layer and second film layer are monolayered, both the first film layer and second film layer are multilayered, the first film layer is monolayered and the second film layer is multilayered, or the first film layer is multilayered and the second film layer is monolayered. The monolayered or multilayered second film layer can be nonoriented or oriented and annealed as described above for the monolayered and multilayered first film layer. In an embodiment, referring to FIGS. 1A, 1B, 1C, 1D and 1E the label has a thickness T which includes the thickness of the first film layer $T_{FFL}$ and the thickness of the adhesive layer $T_{AL}$, or the thickness of the first film layer $T_{FFL}$, the thickness of the second film layer $T_{SFL}$ and the thickness of the adhesive layer $T_{AL}$, or the thickness of the first film layer $T_{FFL}$, the thickness of the second film layer $T_{SFL}$, the thickness of the tie layer $T_{TL}$ or the lamination adhesive layer $T_{LAL}$ and the thickness of the adhesive layer $T_{AL}$. The film has a thickness which is the thickness of the first film layer $T_{FFL}$, or includes the thickness of the first film layer $T_{FFL}$ and the thickness of the second film layer $T_{SFL}$, or includes the thickness of the first film layer $T_{FFL}$, the thickness of the second film layer $T_{SFL}$ and the thickness of the tie layer $T_{TL}$ or the lamination adhesive layer $T_{LAL}$. In embodiments the thickness in micrometers of the film and the first film layer $T_{FFL}$ can range from 5 to 254, 6 to 127, or 7 to 63.5. In embodiments the first film layer, the second film layer, the tie layer and the lamination adhesive layer can each have a thickness, respectively $T_{FFL}$ and $T_{SFL}$ and $T_{TL}$ and $T_{LAL}$, in micrometers ranging from 1.7 to 85, 2 to 42, or 2.3 to 21.

The film can be treated on one surface or both of its surfaces to enhance performance to include abrasion resistance, moisture resistance, and adhesion of an ink or adhesive to a surface or surfaces of the film. Surface treatments include a corona discharge treatment, a flame treatment, a plasma treatment, a topcoat treatment, or combinations of two or more of any of the foregoing treatments. Topcoat treatments include treatment of one or both surfaces of the film with an ink-receptive or adhesive-receptive material such as for example an acrylic primer and/or with a protective varnish. The treatments can be done any time during the manufacture and subsequent processing of the film and label where the time of the treatment generally depends on the performance enhancement. For example a treatment to enhance ink reception would precede a printing step while a topcoating for abrasion resistance might follow a printing step. In an embodiment the first surface or the second surface of the film is surface treated to enhance adhesion of an ink to the film. In an embodiment the second surface of the film is surface treated to enhance adhesion of an adhesive to the film. In an embodiment the first surface of the film is surface treated to enhance abrasion resistance and/or moisture resistance of the film.

In several embodiments the label includes a film, an adhesive layer, and a release liner. The label of the present invention can be prepared in any manner. In an embodiment a film or one or more film layers can be slit into widths suitable for subsequent processing steps or labeling operations. In embodiments the film can be coated with an adhesive to form an adhesive layer and then the film and adhesive layer can be combined in a lamination step with a release liner, or a release liner can be coated with an adhesive to form an adhesive layer and then the release liner and adhesive layer can be combined in a lamination step with the film. The label containing a film, adhesive layer and release liner can be further processed to include printing steps and/or die-cutting steps. In an embodiment the label, containing a film and adhesive layer and release liner, can be printed using any printing means and using any printing ink. Printing means include for example offset lithography, flexographic, digital, thermal, inkjet and laser. Printing inks include for example water-based inks, solvent-based inks and UV-activated inks. Alternatively in another embodiment a film or a film layer can be printed prior to eventually combining with an adhesive layer or with an adhesive layer and release liner as described above. In embodiments the film is monolayered or multilayered and has a first outer surface and a second outer surface where the first outer surface of the film has a print layer or the second outer surface of the film has a print layer which can also have an adhesive layer adhesively joined to the print layer. In an embodiment the film is multilayered and has two or more layers where a print layer is located between the layers of the film. In an embodiment the film is multilayered and has a first film layer and a second film layer where either the first film layer or the second film layer is printed and then the first film layer and the second film layer are combined in a lamination step where a print layer is located between the first film layer and second film layer. In an embodiment a label containing a printed or nonprinted film, adhesive layer and release liner is die-cut using any die-cutting means, to include for example a rotary cutting die, where as a result of the die-cutting a die-cut ladder-shaped matrix of the film and adhesive layer is formed that contains a series of individual labels on the release liner which acts as a carrier for the labels. This die-cut series of labels can then be used to label articles in a labeling process where individual labels are successively removed from the release liner and the die-cut ladder-shaped matrix. Processing to include extrusion, coextrusion, orienting, annealing, coating, surface treatments, label construction, printing, die-cutting and labeling of articles is further described in U.S. Pat. No. 7,217,463 to Henderson and U.S. Pat. No. 7,144,542 to Holzer et al.

Label Construction

In an embodiment a label includes a film having an upper or first surface and a lower or second surface and comprising a first film layer, and an adhesive layer having an upper or first surface and a lower or second surface where the first surface of the adhesive layer is adhesively joined to the second surface of the film. In an embodiment a label 10 includes a film comprising a first film layer 12 having a first surface 11 and a second surface 13 and a thickness $T_{FFL}$, and an adhesive layer 14 having a first surface 15 and a second surface 17 and a thickness $T_{AL}$ where the first surface 15 of the adhesive layer 14 underlies the second surface 13 of the first film layer 12. The term "underlie" and related term "overlie" when referring to a first layer underlying or overlying a second layer mean that the first layer can partially or fully cover the second layer and that the first layer and second layer can be in direct contact with each other or that one or more intermediate layers, to include for example tie layers or lamination adhesive layers, can be located between the first layer and second layer. In an embodiment a label 20 includes a film comprising a second film layer 22 having a first surface 21 and a second surface 23 and a first film layer 12 having a first surface 11 and a second surface 13 and a thickness $T_{FFL}$, and an adhesive layer 14 having a first surface 15 and a second surface 17 and a thickness $T_{AL}$ where the first surface 11 of the first film layer 12 underlies the second surface 23 of the second film layer 22 and the first surface 15 of the adhesive layer 14 underlies the second surface 13 of the first film layer 12. In an embodiment a label 30 includes a film comprising a first film layer 12 having a first surface 11 and a second surface 13 and a thickness $T_{FFL}$ and a second film layer 22 having a first surface 21 and a second surface 23, and an adhesive layer 14 having a first surface 15 and a second surface 17 and a thickness $T_{AL}$ where the first surface 21 of the second film layer 22 underlies the second surface 13 of the first film layer 12 and the first surface 15 of the adhesive layer 14 underlies the second surface 23 of the second film layer 22. In an embodiment a label 40 includes a film comprising a second film layer 22 having a first surface 21 and a second surface 23 and a thickness $T_{SFL}$ and a tie layer or lamination adhesive layer 26 having a first surface 25 and a second surface 27 and a first film layer 12 having a first surface 11 and a second surface 13, and an adhesive layer 14 having a first surface 15 and a second surface 17 and a thickness $T_{AL}$ where the first surface 25 of the tie or lamination adhesive layer 26 underlies the second surface 23 of the second film layer 22 and the first surface 11 of the first film layer 12 underlies the second surface 27 of the tie or lamination adhesive layer 26 and the first surface 15 of the adhesive layer 14 underlies the second surface 13 of the first film layer 12. In an embodiment a label 50 includes a film comprising a first film layer 12 having a first surface 11 and a second surface 13 and a tie layer or lamination adhesive layer 26 having a first surface 25 and a second surface 27 and a second film layer 22 having a first surface 21 and a second surface 23 and a thickness $T_{SFL}$, and an adhesive layer 14 having a first surface 15 and a second surface 17 and a thickness $T_{AL}$ where the first surface 25 of the tie or lamination adhesive layer 26 underlies the second surface 13 of the first film layer 12 and the first surface 21 of the second film layer 22 underlies the second surface 27 of the tie or lamination adhesive layer 26 and the first surface 15 of the adhesive layer 14 underlies the second surface 23 of the second film layer 22. In embodiments as described hereinabove the thickness $T_{FFL}$ of the first film layer 12 is greater than the thickness $T_{AL}$ of the adhesive layer 14. In embodiments the film or label has high clarity visual aesthetics where the film or label is clear having a TAPPI (Technical Association of the Pulp and Paper Industry) T425 opacity of 12% or less, 10% or less, or 8% or less and a haze (ASTM D2003) of 12% or less, 10% or less, or 8% or less. In embodiments the film or label is dispensable during a labeling operation where the film or label has an ISO (International Organization for Standardization) 2493 bending resistance in mN (milliNewtons) of at least 14, at least 16, at least 18, or at least 20. In embodiments a label 10, 20, 30, 40 or 50 includes an adhesive layer 14 having a second surface 17 and a release liner 62 having a first surface 61 and a second surface 63 where the first surface 61 of the release liner 62, which normally includes a release coating, is releasably attached to the second surface 17 of the adhesive layer 14. The label of the present invention can comprise a monolayered or multilayered first film layer and a monolayered or multilayered second film layer where the label can include any type of layer construction regarding the ordering of film layers such as for example alternating first film layers and second film layers.

Label Removability

The labels of the present invention are removable from a container during an industrial washing process when subjected to a warm or hot washing fluid. The washing fluid includes washing liquids such as for example water or an aqueous caustic solution where the temperature of the washing fluid or washing liquid is usually at least about 50° C. and typically can range from 50 to 100° C. Aqueous caustic solutions include for example aqueous caustic soda solutions which can be dilute solutions containing 0.5 to 4% by weight sodium hydroxide. In embodiments an aqueous caustic solution can have a pH of at least 4, at least 6, at least 7, or at least 8 where pH is defined as— log (logarithm to the base 10) of the hydrogen ion concentration in the solution. The containers include those described hereinabove such as for example plastic and glass containers which can be used in the beverage industry and are reusable and/or recyclable. In an embodiment the container is a glass beer bottle which is reusable and/or recyclable. In an embodiment a labeled container includes a label, as described throughout the Detailed Description and Drawings and Claims, and a container where (i) the label 10, 20, 30, 40 or 50 is attached to the container 72 having a vertical axis which is parallel to the height of the container and a horizontal axis which is parallel to the circumference of the container where the second surface of the adhesive layer is adhesively joined to an outer surface of the container, (ii) the machine direction or the transverse direction of the first film layer circumferentially follows the horizontal axis of the container where the machine direction or the transverse direction that circumferentially follows the horizontal axis of the container has a tensile modulus (ASTM D882) of at least 900 MPa after immersion in water at a temperature of about 80° C. for at least about 3 minutes, and (iii) the label is removable from the container after immersion in a washing liquid where the temperature of the washing liquid is at least 50° C., greater than 50° C., greater than 55° C., or greater than 60° C. and the label detaches from the container. In embodiments the term "follows" means that the machine direction or the transverse direction of the first film layer that circumferentially follows the horizontal axis of the container can be parallel to the horizontal axis or that the machine or transverse direction can form an angle with the horizontal axis of less than 45° (45 degrees), less than 20°, or less than 10°. In embodiments the container of the above described labeled container can be any shaped container to include a cylindrically shaped container where the vertical axis of the container is parallel to the length of the cylindrically shaped container and the horizontal axis of the container is parallel to the circumference of the cylindrically shaped container. In an embodiment a method of removing a label from a container includes (i) providing a label 10, 20, 30, 40 or 50 as described throughout the Detailed Description and Drawings and Claims, (ii) attaching the label to a circularly shaped container 72 having a vertical axis which is parallel to the height of the container and a horizontal axis which is parallel to the circumference of the container where the circumference of the container has a circular shape, the second surface of the adhesive layer is adhesively joined to an outer surface of the container, and the machine direction or the transverse direction of the first film layer circumferentially follows the horizontal axis of the container where the machine direction or the transverse direction that circumferentially follows the horizontal axis of the container has a tensile modulus (ASTM D882) of at least 900 MPa after immersion in water at a temperature of about 80° C. for at least about 3 minutes, and (iii) removing the label from the container by immersing the container with the attached label in a washing liquid where the temperature of the washing liquid is at least 50° C., greater than 50° C., greater than 55° C., or greater than 60° C. and the label detaches from the container. In embodiments the above described circularly shaped container includes containers having a circular shape in at least one direction to include spherically and cylindrically shaped containers where the horizontal axis of the circularly shaped container is parallel to the circumference of the container and the circumference of the container has a circular shape. In an embodiment the tendency of a label, as described throughout the Detailed Description and Drawings and Claims, to become detached and removed from a container, after immersion of the container and the attached label in a washing liquid where the temperature of the washing liquid is at least 50° C., is increased by increasing the thickness of the first film layer or by increasing the thickness of the first film layer where the first film layer is monolayered or by increasing the thickness of the first film layer by increasing the thickness of a single layer of the first film layer where the first film layer is multilayered. In an embodiment a label, as described throughout the Detailed Description and Drawings and Claims, becomes detached and removed from a cylindrical glass container within 3 minutes after immersion of the container and the attached label in a washing liquid where the temperature of the washing liquid is at least 50° C., greater than 50° C., greater than 55° C., or greater than 60° C.

Film and Label Examples

The following nonlimiting film examples and label examples further describe and illustrate the present invention.

Table I lists film examples that were used in subsequent label examples and also provides the source and physical properties of the films.

TABLE I

| Film Example No. | Resin Identity[1] | Tensile Modulus, MPa[2] | Areal Dimensional Change, %[3] | Water Absorption, Wt. %[4] |
|---|---|---|---|---|
| 1 | PC | 1810 | 0.4 | 0.9 |
| 2 | BOPP | 1450 | None | 0.4 |
| 3 | BOPET | 3800 | 0.1 | 0.5 |

TABLE I-continued

| Film Example No. | Resin Identity[1] | Tensile Modulus, MPa[2] | Areal Dimensional Change, %[3] | Water Absorption, Wt. %[4] |
|---|---|---|---|---|
| 4 | PMMA | 1290 | 1.4 | — |
| 5 | PA | 600 | 5.4 | 2.6 |

[1]Film Example No. 1 was a 25.4 micrometer thick polycarbonate (PC) monolayered film prepared by extrusion without orientation using Mitsubishi bisphenol A based PC resin E2000. Film Example No. 2 was a 50 micrometer thick biaxially oriented polypropylene (BOPP) monolayered film 50LL534 obtained from ExxonMobil of Baytown, TX. Film Example No. 3 was a 19 micrometer thick biaxially oriented poly(ethylene terephthalate) (BOPET) monolayered film 2CSRN19 obtained from Mitsubishi. Film Example No. 4 was a 50.8 micrometer thick poly(methyl methacrylate) (PMMA) monolayered film prepared by extrusion without orientation using PSR-9 impact modifier containing PMMA resin manufactured by Arkema Inc. Film Example No. 5 was a 58.4 micrometer thick polyamide (PA) monolayered film prepared by extrusion without orientation using Mitsubishi meta-xylenediamine based MXD6 resin.
[2]Tensile modulus (ASTM D882) was measured in the machine direction after immersion of the film in water at a temperature of about 80° C. for at least about 3 minutes.
[3]Absolute areal dimensional change (ASTM D1204) in the machine and transverse directions was measured after immersion of the film in water at a temperature of about 80° C. for at least about 3 minutes. There was no measurable dimensional change for Film Example No. 2.
[4]Water absorption (ASTM D570) was measured after immersion of the film in water at a temperature of about 80° C. for at least about 2 hours.

Table II lists label examples and includes label constructions and results for removability from a container.

TABLE II

| Label Example No. | Label Construction[1] | Removability, Seconds[2] | |
|---|---|---|---|
| | | Ambient | Heated |
| 1 | PC/PSA | 85 | 103 |
| 2 | BOPP/PSA | 35 | >180 |
| 3 | BOPET/PSA | >180 | >180 |
| 4 | PMMA/PSA | 25 | >180 |
| 5 | BOPET/LA/PC/PSA | 10 | 50 |
| 6 | PMMA/LA/PC/PSA | 56 | 154 |
| 7 | PA/LA/PC/PSA | 46 | 58 |
| 8 | PA/LA/PMMA/PSA | 21 | 43 |

[1]Label Examples 1-8 of Table II were prepared from the corresponding Film Examples 1-5 of Table I. Each label example was 76.2 mm (millimeters) high and 50.8 mm wide where the label width was the machine direction of the film or film layers. Each label example was coated with a pressure sensitive adhesive (PSA) at 15 grams per square meter on a dry weight basis. Label Examples 5-8 were prepared by laminating the corresponding film examples together with a lamination adhesive (LA) then applying the pressure sensitive adhesive to the PC side of the laminate in Examples 5-7 and to the PMMA side of the laminate in Example 8.
[2]Label Examples 1-8 were applied to glass bottles having a circumference of 191 mm. The labels were applied to the bottles with the PSA layer in contact with the outer surface of the bottle where the label width followed the circumference or horizontal axis of the bottle. After the bottles were labeled they were stored for 7 days at an ambient temperature of 20-23° C. to simulate an ambient storage or for 2 days at 60° C. followed by 1 day at an ambient temperature of 20-23° C. to simulate a heated storage. After ambient or heated storage, label removability was evaluated by initially immersing the bottles for 1 minute in a 50° C. water bath that simulated a rinsing step and then immersing the rinsed bottles in a water bath at a temperature of about 80° C., that simulated a washing step, and measuring the time in seconds until the label detached from the bottle in a water bath at a temperature of about 80° C. or until 180 seconds had elapsed.

Each of the documents referred to in the Detailed Description is incorporated herein by reference. All numerical quantities in this application used in the Summary of the Invention, Detailed Description and appended Claims are understood to be modified by the word "about" except in the examples or where explicitly indicated otherwise. All range and ratio limits in the Summary of the Invention, Detailed Description and appended Claims are understood to be combinable.

While the invention has been presented in the Detailed Description and appended Claims, it is understood that various modifications of this invention will become apparent to those skilled in the art upon reading this application. Therefore these various modifications, that fall within the scope of the appended Claims and/or Detailed Description, are considered to be a part of this invention.

What is claimed is:
1. A label, the label comprising:
(a) a film having a first surface and a second surface and comprising a first film layer; and
(b) a pressure sensitive adhesive layer having a first surface and a second surface and comprising an adhesive wherein the first surface of the adhesive layer is adhered to the second surface of the film;
wherein the first film layer comprises at least one thermoplastic polymer, wherein the first film layer has a tensile modulus (ASTM D882) in a machine direction or a transverse direction of at least 900 MPa after immersion in water at a temperature of about 80° C. for at least about 3 minutes, and the first film layer has an absolute areal dimensional change (ASTM D1204) of less than 5.0% after immersion in water at a temperature of about 80° C. for at least about 3 minutes,
wherein the thermoplastic polymer of the first film layer comprises a polymer selected from the group consisting of a (meth)acrylate polymer, a styrene polymer, a halogen-containing polymer, a polycarbonate, a polyacrylonitrile, an aromatic polyether, an aromatic polyimide, an aromatic polyamide-imide, and a mixture of two or more of any of the foregoing polymers,
wherein the pressure sensitive adhesive exhibits at least one of a decrease in adhesion strength at temperatures above a room or ambient temperature, a decrease in adhesion strength on contact with an aqueous caustic solution, and combinations thereof,
wherein the label has an opacity of 12% or less, and
wherein the first film layer is nonoriented.
2. The label of claim 1 wherein the thickness of the first film layer is greater than the thickness of the adhesive layer.
3. The label of claim 1 wherein the thickness of the first film layer is at least 5% greater than the thickness of the adhesive layer.
4. The label of claim 1 wherein the first film layer has a water absorption (ASTM 0570) of less than 2.1% by weight after immersion in water at a temperature of about 80° C. for at least about 2 hours.
5. The label of claim 1 wherein the first film layer is nonoriented.
6. The label of claim 1 wherein the film is a monolayered film.
7. The label of claim 1 wherein the film is a multilayered film.
8. The label of claim 1 wherein the first film layer comprises two or more layers.
9. The label of claim 1 wherein the film comprises a second film layer comprising at least one thermoplastic polymer wherein the second film layer has a property selected from
(i) a tensile modulus (ASTM D882) in a machine direction or a transverse direction of at least 900 MPa after immersion in water having a temperature of around 80° C. for a period of about 3 minutes; and
(ii) an absolute areal dimensional change (ASTM D1204) of less than about 5.0% after immersion in water having a temperature of around 80° C. for a period of about 3 minutes and a combination of the two foregoing properties.
10. The label of claim 9 wherein the second film layer comprises two or more layers wherein each of said two or more layers of the second film layer has a property selected from
(i) a tensile modulus (ASTM D882) in a machine direction or a transverse direction of at least 900 MPa after immer- sion in water having a temperature of around 80° C. for a period of about 3 minutes; and (ii) an absolute areal dimensional change (ASTM D1204) of less than about 5.0% after immersion in water having a temperature of around 80° C. for a period of about 3 minutes;

and a combination of the two foregoing properties.

11. The label of claim 9 wherein the second film layer has a first surface and a second surface, the first film layer has a first surface and a second surface, the first surface of the first film layer underlies the second surface of the second film layer, and the first surface of the adhesive layer underlies the second surface of the first film layer.

12. The label of claim 9 wherein the first film layer has a first surface and a second surface, the second film layer has a first surface and a second surface, the first surface of the second film layer underlies the second surface of the first film layer, and the first surface of the adhesive layer underlies the second surface of the second film layer.

13. The label of claim 1 wherein the thermoplastic polymer of the first film layer is a polycarbonate.

14. A label, the label comprising:
(a) a film having a first surface and a second surface and comprising a first film layer, the first film layer comprising at least one thermoplastic polymer,
wherein the first film layer has a tensile modulus (ASTM D882) in a machine direction or a transverse direction of at least 900 MPa after immersion in water at a temperature of about 80° C. for at least about 3 minutes, and the first film layer has an absolute areal dimensional change (ASTM D1204) of less than 5.0% after immersion in water at a temperature of about 80° C. for at least about 3 minutes;
(b) a pressure sensitive adhesive layer having a first surface and a second surface, wherein the first surface of the adhesive layer is adhered to the second surface of the first film;
wherein the film comprises a second film layer comprising at least one thermoplastic polymer wherein the second film layer has a property selected from
(i) a tensile modulus (ASTM D882) in a machine direction or a transverse direction of at least 900 MPa after immersion in water having a temperature of around 80° C. for a period of about 3 minutes; and
(ii) an absolute areal dimensional change (ASTM D1204) of less than about 5.0% after immersion in water having a temperature of around 80° C. for a period of about 3 minutes and a combination of the two foregoing properties,
wherein the thermoplastic polymer of the first film layer comprises a polymer selected from the group consisting of a (meth)acrylate polymer, a styrene polymer, a halogen-containing polymer, a polycarbonate, a polyacrylonitrile, an aromatic polyether, an aromatic polyimide, an aromatic polyamide-imide, and a mixture of two or more of any of the foregoing polymers,
wherein the thermoplastic polymer of the second film layer comprises a polymer selected from the group consisting of a polyolefin, a (meth)acrylate polymer, a styrene polymer, a polyester, a halogen-containing polymer, a polycarbonate, a polyacrylonitrile, an aromatic polyether, an aromatic polyimide, an aromatic polyamide-imide, and a mixture of two or more of any of the foregoing polymers,
wherein the pressure sensitive adhesive exhibits at least one of a decrease in adhesion strength at temperatures above a room or ambient temperature, a decrease in adhesion strength on contact with an aqueous caustic solution, and combinations thereof,
wherein the label has an opacity of 12% or less, and
wherein the first film layer is nonoriented.

15. The label of claim 14 wherein the second film layer exhibits a water absorption of more than 1.6%.

16. The label of claim 14 wherein the second film layer exhibits a water absorption of less than 2.1%.

17. The label of claim 14, wherein the first film layer exhibits a water absorption of less than 2.1%.

18. The label of claim 14 wherein the at least one layer has a linear shrinkage (ASTM D1204) at 100° C. in the machine direction and the transverse direction of less than 5%.

19. The label of claim 14 further comprising a print layer located between the layers of the film.

20. The label of claim 14 wherein the first film layer comprises two or more layers.

21. The label of claim 14 wherein the first surface of the first film layer underlies the second surface of the second film layer and wherein the tensile modulus of the first film layer is greater than or equal to the tensile modulus of the second film layer after immersion of the label in water having a temperature of around 80° C. for a period of about 3 minutes.

22. The label of claim 14 wherein the first and second film layers are nonoriented.

23. The label of claim 14 wherein the thermoplastic polymer of the first film layer is a polycarbonate.

24. The label of claim 14 wherein the thermoplastic polymer of the first film layer is a (meth)acrylate polymer.

25. The label of claim 1 or 14 wherein the label further comprises a release liner having a first surface and a second surface wherein the first surface of the release liner is releasably attached to the second surface of the adhesive layer.

26. A labeled container, comprising:
the label of claim 1 or 14; and
a container having a horizontal axis;
wherein the label is attached to the container wherein the second surface of the adhesive layer is adhesively joined to an outer surface of the container, and the machine direction or the transverse direction of the first film layer circumferentially follows the horizontal axis of the container.

27. The labeled container of claim 26 wherein the container is a cylindrically shaped container and the horizontal axis of the container is parallel to the circumference of the cylindrically shaped container.

28. A method of removing a label from a container, comprising:
(i) providing a labeled container of claim 26;
(ii) removing the label from the container by immersing the container with the attached label in a liquid wherein the temperature of the liquid is at least about 50° C. and the label detaches from the container.

29. The method of claim 28 wherein the liquid is water or a caustic aqueous solution.

* * * * *